United States Patent Office 3,325,543
Patented June 13, 1967

3,325,543
1-ARYL-PERCHLORO-2-AZA-2-ALKENES AND
PREPARATION THEREOF
Eberhart Degener, Leverkusen, Hans-Georg Schmelzer, Cologne-Buchforst, and Hans Holtschmidt, Cologne-Stammheim, Germany, assignors to Farbenfabriken Bayer Aktiengesellschaft, Leverkusen, Germany, a German corporation
No Drawing. Filed Mar. 17, 1964, Ser. No. 352,653
Claims priority, application Germany, Apr. 25, 1963,
F 39,583
8 Claims. (Cl. 260—566)

The primary object of the present invention is novel 1-aryl-perchloro-2-aza-2-alkenes. A further object is a process for producing these 1-aryl-perchloro-2-aza-2-alkenes.

It has been found that an excellent yield of 1-aryl-perchloro-2-aza-2-alkenes of the general formula $$Ar-\underset{\underset{Cl}{|}}{\overset{\overset{Cl}{|}}{C}}-N=C\overset{Cl}{\underset{R_1}{\diagdown}}$$

wherein Ar represents an aryl radical which may be substituted and $R_1$ represents chlorine, perchloroalkyl or an aryl radical, which may be substituted, is obtained if carboxylic acid imido chlorides of the general formula $$R_2-CH_2-N=C\overset{Cl}{\underset{R_3}{\diagdown}}$$

wherein $R_2$ represents hydrogen, alkyl or an aryl radical which may be substituted and $R_3$ represents hydrogen, perchloroalkyl or an aryl radical which may be substituted, at least one of the radicals $R_2$ or $R_3$ being an aryl radical which may be substituted, are chlorinated at temperatures between 10 and 220° C. The hydrochlorides of the carboxylic acid imido chlorides are also suitable as starting products.

Acid imido chlorides which are particularly suitable for chlorination according to the process of the invention are those in which the aryl radical as contained in the definition of $R_2$ and $R_3$ is phenyl or naphthyl substituted one or more times with chlorine, perchloroalkyl, perfluoroalkyl or nitro groups, the alkyl radical of $R_2$ is a lower alkyl having 1 to 6 carbon atoms and the perchloroalkyl radical of $R_3$ is one having 1 to 6 carbon atoms.

Some examples of the carboxylic acid imido chlorides which can be chlorinated according to the process of the invention are the following:

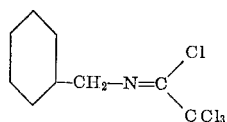

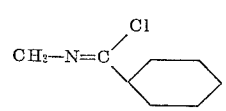

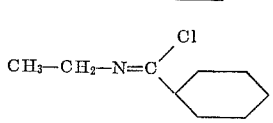

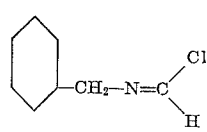

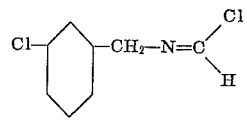

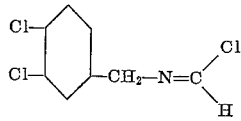

In the 1-aryl-perchloro-2-aza-2-alkenes of the formula $$Ar-\underset{\underset{Cl}{|}}{\overset{\overset{Cl}{|}}{C}}-N=C\overset{Cl}{\underset{R_1}{\diagdown}}$$

produced according to the invention Ar represents preferably a phenyl or naphthyl radical which may be substituted by one or more chlorine, $C_1$ to $C_6$ perchloroalkyl, $C_1$ to $C_6$ perfluoroalkyl or nitro groups and $R_1$ represents preferably a phenyl or naphthyl radical which may be substituted by one or more chlorine, $C_1$ to $C_6$ perchloroalkyl, $C_1$ to $C_6$ perfluoroalkyl or nitro groups, a chlorine atom or a $C_1$ to $C_6$ perchloroalkyl radical.

In the process according to the invention, the imidochlorides can be chlorinated in solid form or in solution. Suitable solvents are inert solvents such as chloroform, carbon tetrachloride, tetrachloroethane, 1,2-dichlorobenzene and 1,2,4-trichlorobenzene. Thionyl chloride is also suitable as solvent, e.g., if thionyl chloride is used in excess for preparing the carboxylic acid imido chlorides from the corresponding amides, chlorine may be introduced directly into the solution formed. The less soluble imido chloride hydrochlorides are advantageously chlorinated in suspension, e.g., in one of the said solvents. During the chlorination, the imido chloride hydrochlorides are completely dissolved. The chlorination is carried out with gaseous chlorine.

With those imido chlorides which are particularly liable to under a J. V. Braun degradation, it is advisable to start the chlorination at temperatures from approximately 10° C. to 20° C. slowly raising the temperature during the chlorination. In order to complete the chlorination, the temperature, after removing a low-boiling solvent, if desired, can be raised to 220° C. It is preferred to use temperatures from 100 to 180° C. It is advantageous to catalyze the chlorination reactions by exposure to light, especially ultra-violet light. The chlorination products are generally formed in yields of more than 70% of the theoretical and can be purified by distillation or by recrystallization. In many cases the yield is almost quantitative.

The new 1-aryl-perchloro-2-aza-2-alkenes constitute effective insecticides. For instance, a 100% mortality of Drosophila was found with 1-phenyl-1,1,3,3-tetrachloro-2-aza-2-propene in concentrations of 0.1% in a spraying test.

*Example 1*

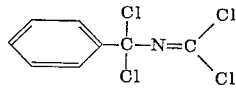

Chlorine is introduced into the boiling suspension of 200 parts by weight of N-benzyl formimidochloride hydrochloride in 600 parts by weight of chloroform while the suspension is being exposed to ultraviolet light. The chloroform is simultaneously distilled off. As the chlorination begins, the N-benzyl formimidochloride hydrochloride dissolves. After complete removal of the solvent, the chlorination is continued, whilst slowly raising the temperature to 180° C., until the weight is constant. Then, the reaction mixture is distilled under high vacuum. The desired 1-phenyl-1,1,3,3-tetrachloro-2-aza-2-propene distils over at 96–99° C./0.2 mm. as a colorless oil, and solidifies in the flask to form coarse crystals with the melting point 55° C.; yield: 260 parts by weight or 96% of the theoretical.

*Example 2*

Into a solution of 50 parts by weight of N-methyl benzimidochloride in 80 parts by weight of carbon tetrachloride, chlorine is introduced at 25° C. until no more chlorine is absorbed. The chlorination is then continued in the presence of ultraviolet light, the temperature being raised slowly up to the boiling point of the carbon tetrachloride. Then, after removing the solvent, chlorination is completed at 140° C. until the weight is constant. The reaction product is distilled in a water jet vacuum. At 157–159° C./17 mm., 60 parts by weight (72% of the theoretical) of a colorless oil are collected, this oil solidifying on cooling into large crystals with a melting point of 55° C. The product is identical with the 1-phenyl-1,1,3,3-tetrachloro-2-aza-2-propene obtained in Example 1.

Calculated for $C_8H_5Cl_4N$ (257): C, 37.35; H, 1.95; Cl, 55.25; N, 5.45. Found: C, 37.77; H, 2.16; Cl, 54.20; N, 5.47.

*Example 3*

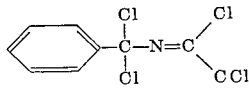

130 parts by weight of N-benzyl trichloroacetimidochlorine are chlorinated while being exposed to ultraviolet light, slowly raising the temperature from 100 to 135° C. until the weight is constant. The reaction mixture solidifies after cooling into a crystal magma, which is suction-filtered. The colorless crystals melt at 137–138° C. after being recrystallized from benzene. The yield of 1-phenyl-1,3,3-trichloro-3-trichloromethyl-2-aza-2-propene is 140 parts by weight or 86% of the theoretical.

Calculated for $C_9H_5Cl_6N$ (340): C, 31.76; H, 1.47; Cl, 62.65; N, 4.12. Found: C, 31.72; H, 1.53; Cl, 62.05; N, 4.10.

*Example 4*

Into a solution of 60 parts by weight of N-ethylbenzimidochloride in 50 parts by weight of carbon tetrachloride, chlorine is introduced at room temperature, until absorption is complete. Then, while slowly raising the temperature to boiling point and while exposing to ultraviolet light, the chlorination is continued. The solvent is then distilled off and the chlorination continued at 130° C. until the increase in weight has ceased. The reaction product crystallizes out on cooling; yield: 120 parts by weight or 98% of the theoretical. After recrystallization from benzene, the colorless crystals melt at 137–138° C. The product is identical with the 1-phenyl-1,1,3-trichloro-3-trichloromethyl-2-aza-2-propene obtained according to Example 3.

*Example 5*

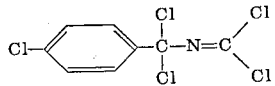

Into a solution of N-(4-chlorobenzyl)-formidochloride hydrochloride in thionyl chloride, which has been obtained by the reaction of 160 parts by weight of N-(4-chlorobenzyl) formamide with 400 parts by weight of thionyl chloride, chlorine is introduced, initially at 20° C., while stirring and irradiating with ultraviolet light. During the chlorination, the temperature is raised slowly to the boiling point of the solution. The absorption of chlorine has finished after 6 hours. The thionyl chloride is distilled off in vacuo and the chlorination is continued, while irradiating with ultraviolet light and slowly raising the temperature to 180° C., until the increase in weight has ceased.

By fractional distillation of the chlorination product under high vacuum, there are obtained at 117 to 122° C./0.03 mm., 188 parts by weight or 69% of the theoretical yield (based on the N-(4-chlorobenzyl)-formamide used) of a colorless oil having the refractive index $n_D^{20}=1.6167$.

Calculated for $C_8H_4Cl_5N$ (291.5): C, 32.93; H, 1.37; Cl, 60.89; N, 4.81. Found: C, 33.26; H, 1.42; Cl, 60.00; N, 5.40.

*Example 6*

Chlorine is introduced into a solution of 38 parts by weight of N-methyl-4-chlorobenzimidochloride in 40 parts by weight of carbon tetrachloride while stirring and irradiating the solution with ultraviolet light at 20° C. The temperature is slowly raised to the boiling point of the solution and chlorination takes place under reflux until the absorption of chlorine has ceased. The solvent is then distilled off and the chlorination is continued, finally at a temperature of 180° C., until the increase in weight has ceased. The chlorination mixture is fractionated under high vacuum. At 134–139° C./0.4 mm., 44 parts by weight or 75% of the theoretical yield of a colorless oil with the refractive index $n_D^{20}=1.6132$ distil over. The compound is identical with the 1-(4-chlorophenyl)-1,1,3,3-tetrachloro-2-aza-2-propene obtained according to Example 5.

Calculated for $C_8H_4Cl_5N$ (291.5): C, 32.93; H, 1.37; Cl, 60.89; N, 4.81. Found: C, 33.25; H, 1.40; Cl, 60.90; N, 4.80.

*Example 7*

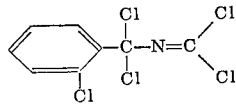

The procedure of Example 6 is followed, but using a solution of 66.5 parts by weight of N-methyl-2-chlorobenzimidochloride in 70 parts by weight of carbon tetrachloride for the chlorination. By fractional distillation under high vacuum, at 99–109° C./0.21 mm., 80.5 parts by weight or 78% of the theoretical yield of 1-(2'-chlorophenyl)-1,1,3,3-tetrachloro-2-aza-2-propene as a colorless oil with a refractive index $n_D^{20}=1.5902$ are obtained.

Calculated for $C_8H_4Cl_5N$ (291.5): N, 4.81. Found: N, 4.90.

*Example 8*

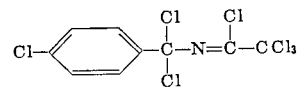

On chlorination of 65 parts by weight of N-ethyl-4-chlorobenzimidochloride according to the process described in Examples 6 and 7, 104.5 parts by weight or 87% of the theoretical yield of 1-(4-chlorophenyl)-1,1,3-trichloro-3-trichloromethyl-2-aza-2-propene as a colorless oil with a boiling point of 163–165° C./0.25 mm. are obtained. The compound crystallizes out in the cold. After recrystallization from acetone, the colorless crystals melt at 78° C.

Calculated for $C_9H_4Cl_7N$ (374.5): C, 28.84; H, 1.07; Cl, 66.36; N, 3.74. Found: C, 29.61; H, 1.24; Cl, 65.15; N, 4.09.

*Example 9*

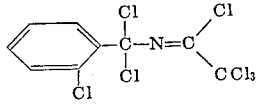

On the chlorination of 82.5 parts by weight of N-ethyl-2-chlorobenzimidochloride by the procedure described in Examples 6 to 8, 149 parts by weight or 97% of the theoretical yield of 1-(2'-chlorophenyl)-1,1,3-trichloro-3-trichloromethyl-2-aza-2-propene in the form of colorless crystals, which melt at 95° C. after being recrystallized from cyclohexane are obtained.

Calculated for $C_9H_4Cl_7N$ (374.5): C, 28.84; H, 1.07; Cl, 66.36; N, 3.74. Found: C, 29.61; H, 1.24; Cl, 65.45; N, 3.79.

*Example 10*

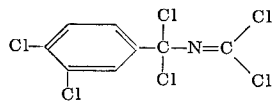

Chlorine is introduced into a solution of N-(3,4-dichlorobenzyl)-formimidochloride hydrochloride in thionyl chloride, which has been obtained by the reaction of 70.5 parts by weight of N-(3,3-dichlorobenzyl)-formamide with 400 parts by weight of thionyl chloride, while stirring, irradiating with ultraviolet light and slowly raising the temperature from 20° C. until the reaction mixture refluxes. After completing the absorption of chlorine, the thionyl chloride is distilled off and the chlorination is continued at a temperature of up to 180° C. until constant weight. By fractional distillation of the chlorination product, 86.5 parts by weight or 77% of the theoretical yield (based on the N-(3,4-dichlorobenzyl)-formamide being used), of 1-(3′,4′-dichlorophenyl)-1,1,3,3-tetrachloro-2-aza-2-propene as a colorless oil with a boiling point 157–158° C./0.3 mm. and with a refractive index $$n_D^{20} = 1.6196$$

are obtained.

Calculated for $C_8H_3Cl_6$ (326): C, 29.45; H, 0.92; Cl, 65.34; N, 4.29. Found: C, 30.41; H, 1.03; Cl, 64.30; N, 4.74.

*Example 11*

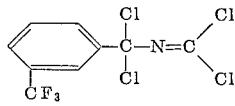

Chlorine is introduced into a solution of 97 parts by weight of 3-(trifluoromethyl)-benzimidochloride in 50 parts by weight of carbon tetrachloride while irradiating the solution with ultraviolet light and while slowly heating from 20° C. to reflux temperature. When no more chlorine is taken up, the solvent is distilled off and the chlorination is continued at a temperature of up to 180° C. until constant weight. On fractional distillation, 122 parts by weight or 86% of the theoretical yield of a colorless oil with a boiling point 84–86° C./0.08 mm. and a refractive index $n_D^{20} = 1.5330$ are obtained.

Calculated for $C_9H_4Cl_4F_3N$ (325): C, 33.23; H, 1.23; Cl, 43.69; F, 17.54; N, 4.31. Found: C, 33.51; H, 1.34; Cl, 43.80; F, 16.80; N, 4.89.

We claim:
1. 1-aryl-perchloro-2-aza-propenes of the formula

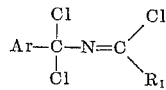

wherein Ar is a member selected from the group consisting of phenyl, monochlorophenyl, dichlorophenyl, trifluoromethylphenyl and trichloromethylphenyl and $R_1$ is a member of the group consisting of chlorine, hydrogen, phenyl, trichloromethylphenyl and trifluoromethylphenyl.

2. 1-phenyl-1,1,3,3-tetrachloro-2-aza-propene.
3. 1-phenyl-1,1,3-trichloro-3-trichloromethyl-2-aza-2-propene.
4. 1-(p-chlorophenyl)-1,1,3,3-tetrachloro-2-aza-propene.
5. Process for the preparation of chlorinated 2-aza-alkenes which comprises reacting a carboxylic acid imidochloride of the formula

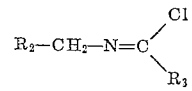

wherein $R_2$ is a member of the group consisting of lower alkyl, phenyl, monochlorophenyl, and dichlorophenyl $R_3$ is a member selected from the group consisting of chlorine, hydrogen, phenyl, chlorophenyl, trichloromethyl and trifluoromethyl with chlorine at a temperature of 10 to 220° C., and recovering the chlorinated 2-aza-alkene thereby formed.

6. Process according to claim 5 which comprises effecting said reaction while irradiating with ultraviolet light.

7. Process according to claim 5 which comprises effecting said reaction in the presence of an inert organic solvent.

8. Process according to claim 7, wherein said inert organic solvent is selected from the group consisting of chloroform, carbon tetrachloride, tetrachloroethane, 1,2-dichlorobenzene and 1,2,4-trichlorobenzene.

References Cited

Holtschmidt: "Angewandte Chemie," vol. 74, pp. 848 to 855 (1962).

CHARLES B. PARKER, *Primary Examiner.*
ROBERT V. HINES, *Assistant Examiner.*